United States Patent [19]

Dohmeier

[11] 3,722,566
[45] Mar. 27, 1973

[54] TIRES

[75] Inventor: Hans Otto Dohmeier, Transvaal Province, Republic of South Africa

[73] Assignee: Dome Inventions (Proprietary) Limited

[22] Filed: Mar. 1, 1971

[21] Appl. No.: 119,541

[30] Foreign Application Priority Data

Mar. 2, 1970   Republic of South Africa...70/1340

[52] U.S. Cl.................................................152/169
[51] Int. Cl.................................................B60c 7/22
[58] Field of Search...........................152/169, 239

[56] References Cited

UNITED STATES PATENTS

| | | | |
|---|---|---|---|
| 1,163,518 | 12/1915 | Farr | 152/169 |
| 3,603,371 | 9/1971 | Muller | 152/239 |
| 1,298,213 | 3/1919 | Hottenstein | 152/169 |

*Primary Examiner*—James B. Marbert
*Attorney*—Kenyon & Kenyon Reilly Carr & Chapin

[57] ABSTRACT

The invention relates to a heavy duty tire and more particularly a pneumatic tire for use with earth moving equipment, wherein there is embedded in at least the tread portion metal elements conveniently in the form of armouring chain, said elements bonded or adhesively fixed to the rubber, ensuring simultaneous wear of both rubber and reinforcing elements.

13 Claims, 1 Drawing Figure

PATENTED MAR 27 1973 3,722,566
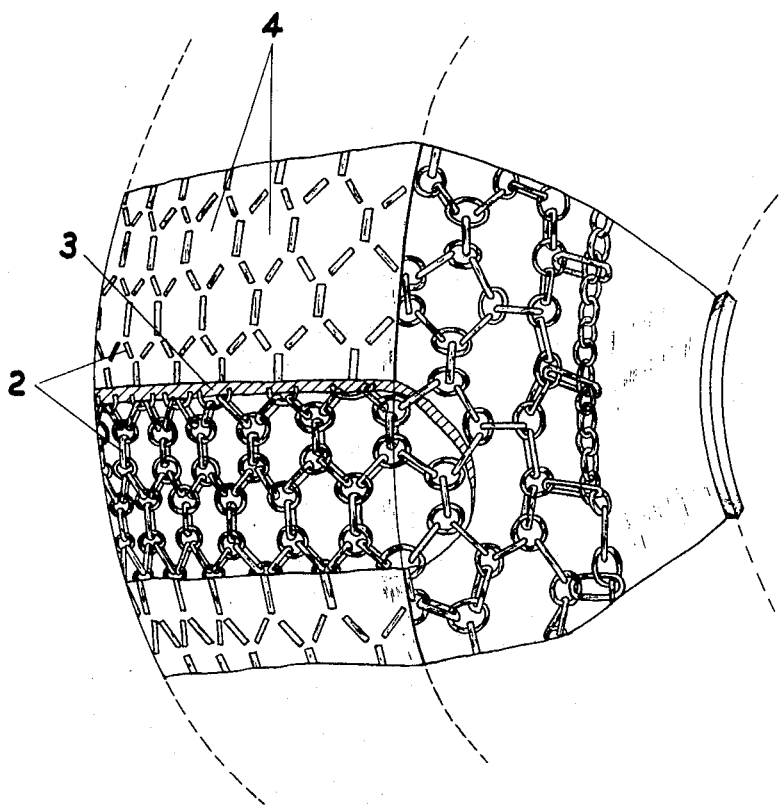
INVENTOR
HANS OTTO DOHMEIER
BY
Kenyon & Kenyon Reilly Carr & Chapin
ATTORNEYS

TIRES

This invention relates to tires and more particularly to heavy duty pneumatic or solid tires often protected by armor chains.

In many applications such as in quarries, or mining pneumatic tires are often covered by a network of steel armor chains to prevent excessive damage to the tire by sharp edges of rocks and the like. However, these chains often snap and are not easily repaired or replaced in time.

It is the object of this invention to combine the strength of a chain and the abrasive resistance and general utility of a rubber surface in a tire.

According to this invention there is provided a tire comprising a network of metal armoring elements embedded in the outer tire tread portion such that the outer surface of the metal elements will be substantially flush with the outer surface of the resilient material of the tire during use and wear.

Further features of this invention provide for the metal elements to be embedded either during the manufacture or during a retreading process, for the resilient material of the tires to embed, adhesively secure or bond to said elements, for the elements to form a hardened armor steel chain or a steel chain of good quality steel not hardened and for the elements to form the tread pattern on the surface of the tire.

A preferred embodiment of the invention will be described below by way of example reference being made to the accompanying drawing which is a part-sectioned perspective view of part of a tire.

In this embodiment a heavy duty pneumatic tire in need of retreading is stripped to its casing and prepared for retreading in the usual manner.

An initial layer or layers of uncured rubber are fitted to the casing in the known manner and in the preferred form this layer of retreading material, known as a "camel back" will include wire reinforcing and will also be at least partially cured before the remaining operations are done. This is not however essential particularly where the use to which the tire is to be put is not in severe working conditions. Next a further layer of camel back is laid onto this base the thickness of this layer is determined in this particular method of retreading by the thickness of the section of chain used.

A hardened steel armor chain network 2 of the conventional type used to protect tires is cleaned and dipped into a bath of rubber-steel adhesive or bonding material before being wrapped onto the prepared tire and tensioned in the usual way.

After this a further layer or layers of the uncured retreading compound is laid on the tread of the tire which is then submitted to a pressure rolling operation. This can be effected by the use of heavy duty buffing machines fitted to give the desired pressure.

This rolling operation beds the armoring chain into the layers on either side until the chain is practically at the outer surface of the tread portion of the tire.

The retreading process is then continued in the conventional way to cure the rubber thus embedding the chain network 2 in the rubber casing 3.

The curing of the rubber is done under conditions of heat and pressure which allows a flow of rubber prior to actual vulcanization and this ensures strong bonding and embedding of the chain in the rubber. The tread pattern 4 of a tire may be obtained from the choice of the linking of the chain links.

In the above example the tread portion of the armoring chain only is embedded in the rubber and the details of the chain assembly can be widely varied.

In some cases it may be desirable to embed the sidewall protection chain as well even though this will result in a material stiffening of the tire.

The chain may be embedded into an underlay or overlay of rubber only and not sandwiched between layers as above described. Or as a further alternative, uncured rubber blocks may be placed between the chain components in the place of a complete overlay where this is considered preferable. Such variations may be desirable because of the costs of manufacture or equipment that is available.

It will further be understood that a special camel back construction can be made with the armoring chain for the tread portion of the tire enveloped in the uncured rubber. This will enable the chain and rubber to be supplied together and placed on the tire in a single operation.

With the arrangement set out in the preceding paragraph or with the rubber and chain laid on the casing in separate operations tires can be provided with armoring in the tread portion only. Separate side wall armoring can be provided and attached to the edges of the chain embedded in the tire tread where desired. This side wall armoring will be tensioned in the usual manner.

All the above variations leave the surface of the tire smooth and the grip for traction is obtained by the inherent yielding of the rubber compared to the chain and thus the pattern of the latter will give in effect, a tread pattern which can be varied to meet the conditions of use to which the tire are to be put.

Where necessary a lugging operation can be done to give a rubber tread portion to the tire though this will not usually be necessary.

The chain can be fixed either by a proper bonding procedure or by the use of adhesive. The former will of course be preferable but the expense may not be warranted when a satisfactory tire for particular usage can be obtained by a cheaper method.

The technical details of the retreading operation are known to those skilled in the art and the actual method of obtaining the chain in the rubber mass may be varied from that described above. For example a heating operation could be included to facilitate the penetration of the chain into the rubber.

It will thus be appreciated that the surface of a pneumatic tires will acquire both the properties of steel and rubber. Under arduous working conditions the steel reinforcements may prevent the slicing and excessive damage which usually occur to a naked rubber surface and the rubber matrix provides the abrasive resistance and resiliency.

Because of the bonding or adhesive and the embedding of the chain 2 within the rubber matrix, the chain links will tend to remain in position even if one or more links are snapped or worn away. This will result in a longer life of the tires as compared with tires with either the naked rubber casing or armor steel protection on the outer surface.

The possibility of continuous use of a tire with broken links does away with the repairing or discarding of chains or tires before full wear has been obtained. Further, on complete wear of the chain the tire may be retreaded and a new chain embedded as described above. It also enables the vehicle fitted with tires according to the invention to be driven at faster speeds than is possible with tires to which armor chains are fitted in conventional manner.

It will be understood that the retreading operations above described are preferred examples and other processes may be used. Also the chain may be embedded when manufacturing a tire in the first instance. The chain may be embedded without special bonding where the tire is not be to subjected to extra working conditions. Here the chain will be held in place securely by being embedded in the mass of rubber.

What I claim as new and desire to secure by Letters Patent is:

1. A tire comprising an outer tread portion, a network of metal elements embedded in said tread portion, such that the outer surface of the elements will be substantially flush with the outer surface of the resilient material of the tire during use and wear.

2. A tire as claimed in claim 1 in which the elements form a hardened steel chain.

3. A tire as claimed in claim 2 in which the chain links form the tread pattern on the surface of the tire.

4. A tire as claimed in claim 1 in which the metal elements are adhesively secured to the resilient material of the tire.

5. A tire as claimed in claim 1 in which the metal elements are bonded to the resilient material of the tire.

6. A tire as claimed in claim 2 in which the chain is embedded during the manufacture of a tire.

7. A tire as claimed in claim 2 in which the chain is embedded during the retreading of a tire.

8. A tire as claimed in claim 2 in which side wall protection chains are attached to the metal elements embedded in the tread portion of the tire.

9. A tire as claimed in claim 8 in which the side wall protection chains are releasably secured to the metal elements in the tread portion of the tire.

10. A tire as claimed in claim 7 in which the rubber layer between the metal elements and the casing includes wire reinforcing.

11. A tire comprising an outer tread portion having a smooth outer surface and being of resilient material, and a network of metal elements including a plurality of chain links and linking chains interconnecting said chain links embedded in said tread portion, each said chain link having an elongated outer surface flush with said smooth outer surface of said tread portion.

12. A tire as set forth in claim 11 where said chain links form a tread pattern on said outer surface of said tread portion.

13. A tire as set forth in claim 11 wherein said network defines a plurality of open spaces with said resilient material of said tread portion occupying said spaces.

* * * * *